(12) United States Patent
Gold et al.

(10) Patent No.: US 10,126,481 B2
(45) Date of Patent: Nov. 13, 2018

(54) LIGHT DEVICE FOR MOTOR VEHICLES

(71) Applicant: Varroc Lighting Systems, s.r.o., Senov u Noveho Jicina (CZ)

(72) Inventors: Pavel Gold, Rybi (CZ); Jan Martoch, Hranice (CZ)

(73) Assignee: Varroc Lighting Systems, s.r.o., Senov u Noveho Jicina (CZ)

( * ) Notice: Subject to any disclaimer, the term of this patent is extended or adjusted under 35 U.S.C. 154(b) by 0 days.

(21) Appl. No.: 15/611,572

(22) Filed: Jun. 1, 2017

(65) Prior Publication Data

US 2017/0350571 A1    Dec. 7, 2017

(30) Foreign Application Priority Data

Jun. 3, 2016   (CZ) .................................. 2016-333

(51) Int. Cl.
*F21V 9/00* (2018.01)
*F21V 8/00* (2006.01)
*F21S 43/27* (2018.01)
*F21S 43/14* (2018.01)
*F21S 43/237* (2018.01)
(Continued)

(52) U.S. Cl.
CPC ............ *G02B 6/0031* (2013.01); *F21S 43/14* (2018.01); *F21S 43/237* (2018.01); *F21S 43/245* (2018.01); *F21S 43/247* (2018.01); *F21S 43/27* (2018.01); *F21S 43/31* (2018.01); *F21S 43/40* (2018.01); *F21S 43/50* (2018.01); *G02B 6/0025* (2013.01); *B60Q 1/26* (2013.01)

(58) Field of Classification Search
CPC .......... B60Q 1/26; B60Q 1/2696; B60Q 3/62; B60Q 3/64; B60Q 3/66; B60Q 3/68; F21S 43/235–43/251; F21S 43/27; G02B 6/0001; G02B 6/0023; G02B 6/0025; G02B 6/0031

USPC .................................................. 362/511, 555
See application file for complete search history.

(56) References Cited

U.S. PATENT DOCUMENTS 6,402,353 B2   11/2002 Dealey, Jr. et al.
7,726,854 B2    6/2010 Bourdin et al.
9,182,095 B2   11/2015 Gomez

FOREIGN PATENT DOCUMENTS

CZ   20100955 A3   7/2012
DE   10332977 A1   7/2005
(Continued)

OTHER PUBLICATIONS

Search Report in Corresponding Czech Application PV 2016-333 dated Oct. 6, 2016 (3 pages).

*Primary Examiner* — Jason M Han
(74) *Attorney, Agent, or Firm* — Hovey Williams LLP

(57) ABSTRACT

The light device for motor vehicles comprises a carrier case, a translucent cover, and an inner chamber where the light source and a linear light guide are mounted. A part of the light guide's outer casing forms the output surface for exiting light rays. Light guide's body comprises an active part for output of light rays from the light device, and an inactive part not visible in viewing inner chamber through translucent cover. Light guide includes a case comprising two arms, either one having at least one contact area on its inner surface to attach light guide in its mounting position therebetween. The distance between the contact areas can be increased during introduction of the light guide into its mounting position, and subsequently reduced after mounting of light guide to a distance at which the light guide surface is in contact with the arm contact areas.

16 Claims, 14 Drawing Sheets

Figure 1:
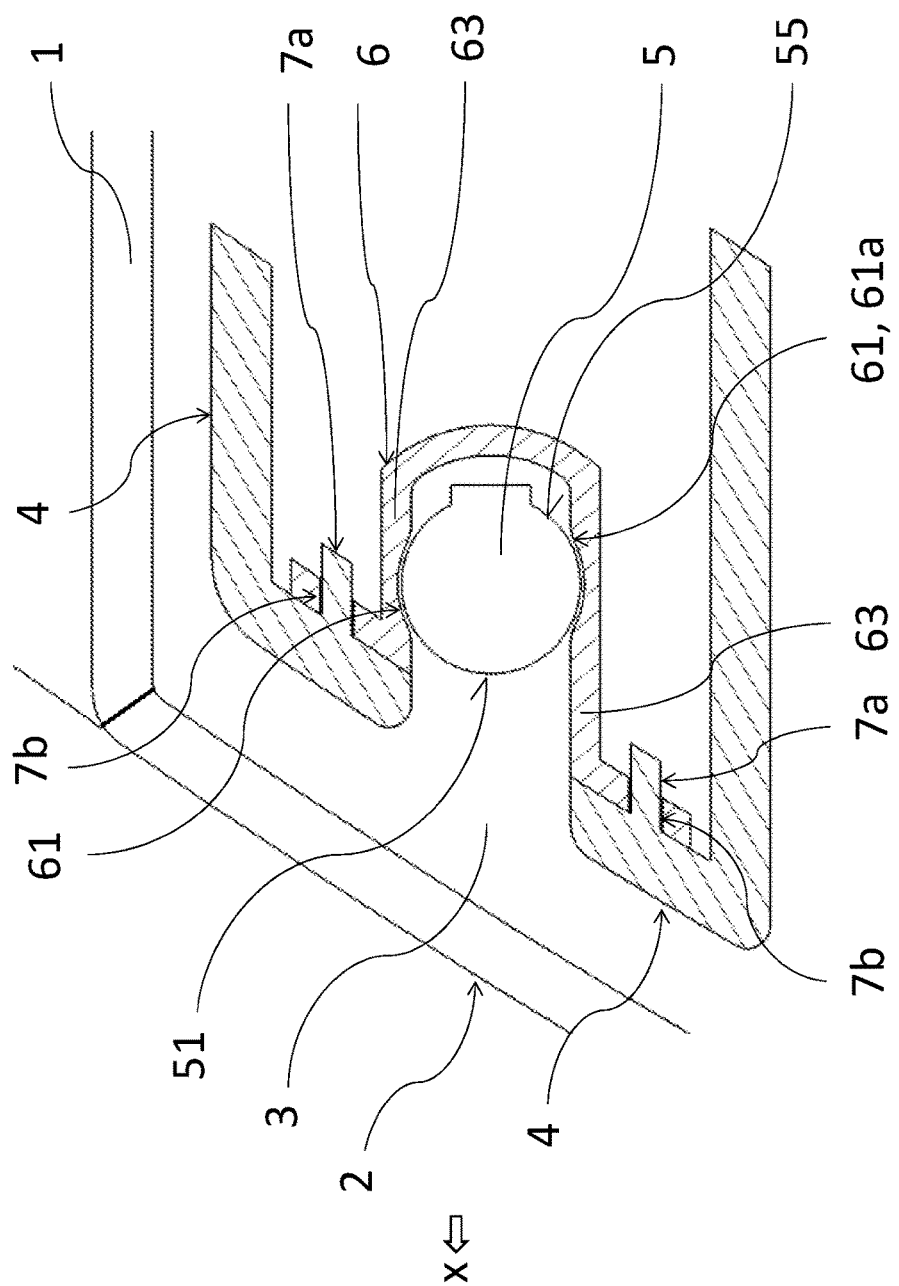

(51) Int. Cl.
*F21S 43/245* (2018.01)
*F21S 43/247* (2018.01)
*F21S 43/31* (2018.01)
*F21S 43/40* (2018.01)
*F21S 43/50* (2018.01)
*B60Q 1/26* (2006.01)

(56) References Cited

FOREIGN PATENT DOCUMENTS

| EP | 1540389 | B1 | 6/2005 |
|----|---------|----|--------|
| EP | 1775511 | A1 | 4/2017 |

LIGHT DEVICE FOR MOTOR VEHICLES

FIELD OF THE INVENTION

The invention belongs to the field of the arrangement of optical signaling devices designed mainly for marking of vehicles, their parts or for signaling, and relates to a light device for motor vehicles fitted with a fixing system to secure the required position of the light guide.

BACKGROUND INFORMATION

One of the current development trends of vehicle lighting is the effort to distinguish a particular car model or model series from competitors' products. To produce interesting optical and designer effects, light guides are used to a great extent that are an integral part of the front or rear lamp of the vehicles, and their light-emitting surfaces are one of the predominant elements of the appearance of the car. In light guides whose transversal profile has a circular or mushroom-like shape, the source of light in the form of LED is usually positioned on one or both of the outwardly oriented frontal surfaces of the light guide. The light guide is generally attached to a part of the light device, e.g. to the covering mask, by means of fixing elements that are part of the light guide. Fixing of the light guide to the other components of the light device must meet requirements not only from the functionality point of view, but it must also meet the designer and functional requirements for the light characteristic of the output light trace.

A light device consisting of a light guide having a longitudinal shape at the front of which a light source is arranged and whose case transmits light in a certain part, forming the output surface for the exit of light rays, is known from the document EP1775511. A reflective surface of the case that is fitted with optical elements (prisms) is arranged opposite the output surface. One part of the rays flowing through the light guide reflects from the reflective side (from the optical elements) to the direction towards the output side of the light guide and exits through the output side of the light guide. The other part of the rays passes through the reflective side out of the light guide, hits a diffusion part arranged outside the light guide and reflects back, passes through the reflective side, reenters the light guide and then exits the light guide through the output side. The light device according to the document EP1775511 is disadvantageous mainly because between the diffusion layer and the light guide there is a free space, which reduces efficiency of the optical system.

A number of designs of fixing of the light guide are known in the prior art. E.g., the document CZ20100955 discloses a light guide for the light equipment of motor vehicles that is supplied by light emitting diodes (LED), which consists of a transparent material and is fitted with a fixing part. The fixing part of this light guide is a longitudinal fixing fin that is installed along more than one half of the light guide length. A disadvantage of this design is the fact that the front light emitting surface of the light guide acts as a cylindrical lens that magnifies every item that is found behind it. The fixing elements of the light guide, e.g. clips, are always visible and at the same time impair the output characteristics of the output light trace, e.g. intensity and homogeneity of the emitted light beam. The fixing elements of the light guide complicate the transmission of light from the light source, reducing the efficiency of both binding the light into the light guide and efficient guiding of light in the light guide. At the fixing elements of the light guide, the light gets unbound and reduces its optical efficiency. Another disadvantage is the fact that for the production of the fixing elements that represent an integral part of the light guide, slider mechanisms in the injection mold are necessary.

The document U.S. Pat. No. 9,182,095 describes a design of a signaling lamp containing a flat shaped carrier, whose shape in its bottom part corresponds to the shape of the light guide in the transversal direction. In its top part, the carrier is fitted with a fixing zone in the form of fixing elements arranged in the form of a continuous row of fixing arms that are fitted with fixing hooks at their free end. To fit the light guide in the pre-determined position, the light guide is equipped with longitudinally arranged ribs cooperating with the fixing hooks. Opposite the fixing ribs, the fixing element is fitted with the bottom support surface of the light guide. The fixing element is further equipped with a lateral contact surface designed to support the light guide at its rear, not light-emitting, surface. The lamp comprises a covering mask that is situated in front of the light guide, as seen from the front, and is designed to mask the fixing zone of the light guide and other uninteresting parts of the lamp from the designer point of view, the covering mask being seated on the fixing element. A disadvantage of this solution is the fact that the light guide is not fixed in any way between the fixing elements having the form of fixing hooks, and in these areas, undesired vibrations and subsequent mechanical damage of the light guide or the fixing elements might occur. The larger number of components of this fixing system also represents a drawback, both from the point of view of financial costs and from the point of view of production complexity of individual components and their completion into the final product.

The object of the present invention is to eliminate the above mentioned disadvantages of the prior art, so that no fixing elements can be visible in the view and light-emitting part of the light guide, that the light guide can be homogeneous all along the length of its active surface in the lit as well as unlit state, and that no fixing elements should hinder the transmission of light to ensure high optical efficiency of the light guide. The entire fixing system must be robust from the mechanical point of view to avoid undesired vibrations, and at the same time the fixing system must be easy to produce with low financial costs of the production and completion of the final product.

PRINCIPLE OF THE INVENTION

The drawbacks of the prior art are substantially eliminated and the object of the invention is met by a light device for motor vehicles comprising a carrier case, covered by a translucent cover, and an inner chamber where the light source for emitting light rays and a light guide of a linear shape for guiding of light rays is mounted, wherein a part of the outer case of the light guide forms the output surface for the exit of light rays. The light guide comprises unbinding optical elements designed to direct the light rays towards the output surface, and its body comprises an active part that is designed for the output of light rays from the light guide and further out of the light device, and an inactive part that is not visible in the view of the inner chamber through the translucent cover, The light guide includes a case comprising two arms, either of which featuring at least one contact area on its inner surface to attach the light guide in its mounting position between the contact areas of the arms. The case is adapted to enable increasing of the distance between the contact areas during the introduction of the light guide into its mounting position, and subsequent reducing of this distance after the introduction of the light guide into its mounting position, to a distance at which the arms are in contact with the light guide surface in the contact areas.

In one of the embodiments of the present invention, at least a part of the case is made of an elastic material to ensure the said possibility to increase the distance between the said contact areas.

In another one of the embodiments, the case is an integral molding made of an elastic material.

In another one of the embodiments, the case is fitted with an elastic element, especially a spring or molded addition of an elastic material to ensure the said possibility to increase the distance between said contact areas.

In another one of the embodiments, the case is fitted with a joint, recess or film hinge to ensure the possibility to increase the distance between the contact areas.

The contact area can be designed as a recess configured in such a way that the complementary part of the surface of the light guide found in the mounting position can bear against its surface.

In another one of the embodiments of the present invention, at least one of the arms comprises a recess configured in such a way that the contact area is made up of points lying on lines that are approximately parallel to the longitudinal axis of the light guide.

In another one of the embodiments, the inner surface of the arms is planar and the contact area is formed by lines, the light guide being attached in its mounting position by the action of pressure of the arms upon the light guide surface.

In one of the embodiments, the case that the light guide is attached to in the mounting position is attached to another part of the light device, to prevent an inadvertent change of the distance of the contact areas that the light guide is attached between in the mounting position, to avoid the possibility of unintended releasing of the light guide from this position.

In one of the embodiments, the light device comprises a covering mask fitted with fixing elements for engagement with the fixing elements created on the case, so that mutual connection of the fixing elements can fix the mutual position of the arms of the case to maintain a permanent distance of the contact areas.

In another one of the embodiments of the present invention, the light guide is fitted with a locating element for the connection with a locating element the case is fitted with, to prevent rotary movement and sliding movement in the direction of the longitudinal axis of the light guide mounted in the case.

The locating element on the case, designed for the connection to the respective locating element on the light guide, can be created on an arm of the case and/or on the rear face of the case mutually connecting the arms.

The locating element that the light guide is fitted with can be positioned in the inactive part of the light guide.

The locating element that the case is fitted with can be an opening, and the opposite locating element, which the light guide is fitted with can be a projection to be inserted into the opening.

In one of the embodiments of the present invention, between the light guide in the mounting position and the case towards its rear face mutually connecting the arms, a chamber is defined that contains an active optical element, especially a diffusion optical element and/or reflective optical element, to return the rays that have escaped from the light guide through a part of its surface, different from the output surface, back to the light guide.

The active optical element can be designed in the form of a diffusion surface and/or reflective surface, which a part or parts of the inner surface that delimits the chamber is/are fitted with.

In another one of the embodiments, the light guide has a smooth surface in all its active part without the presence of any shaped elements, especially projections or recesses, to avoid negative impacts of shaped elements on guiding of light rays in the light guide body.

OVERVIEW OF FIGURES IN THE DRAWINGS

Figure 2:
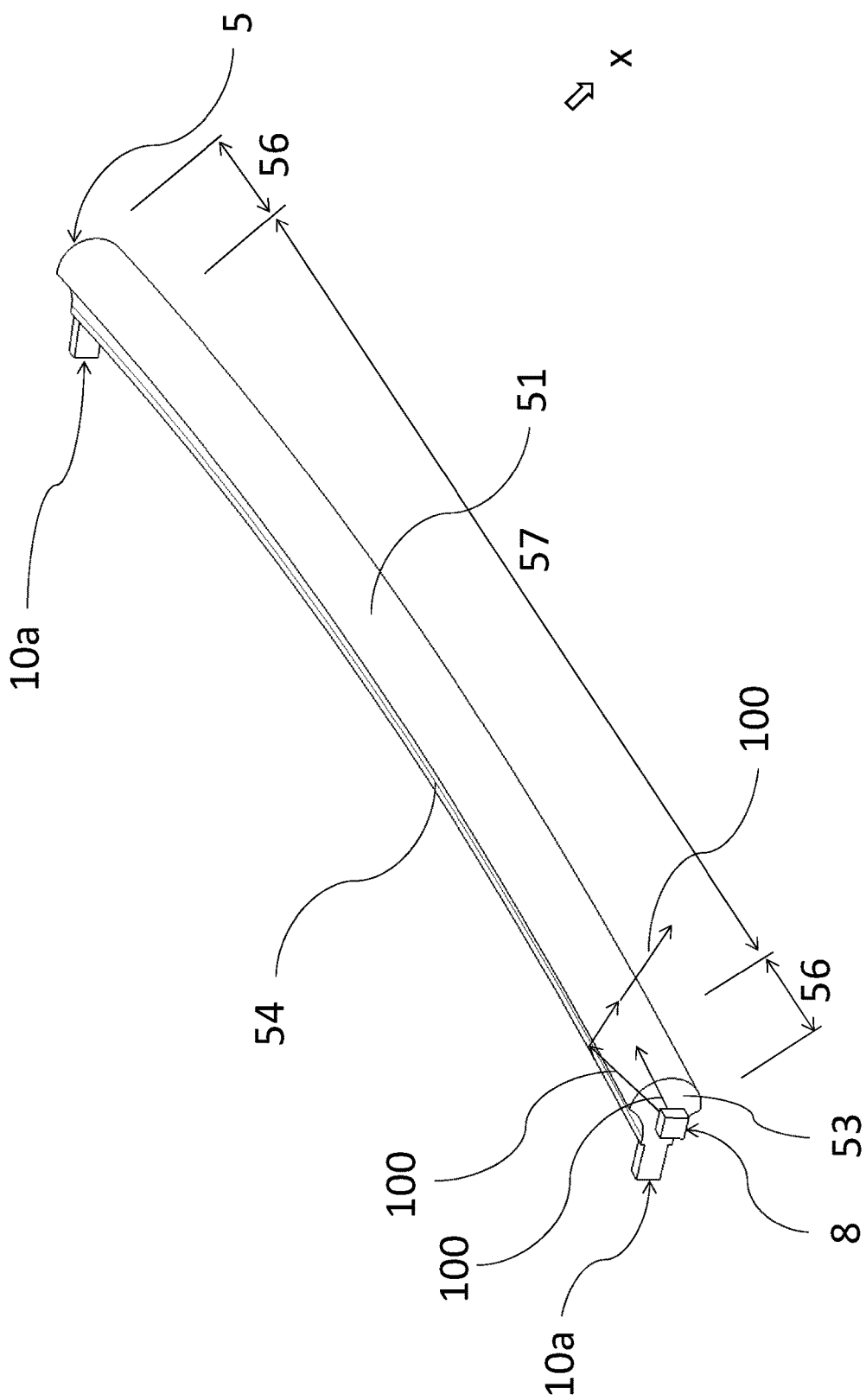
Figure 3:
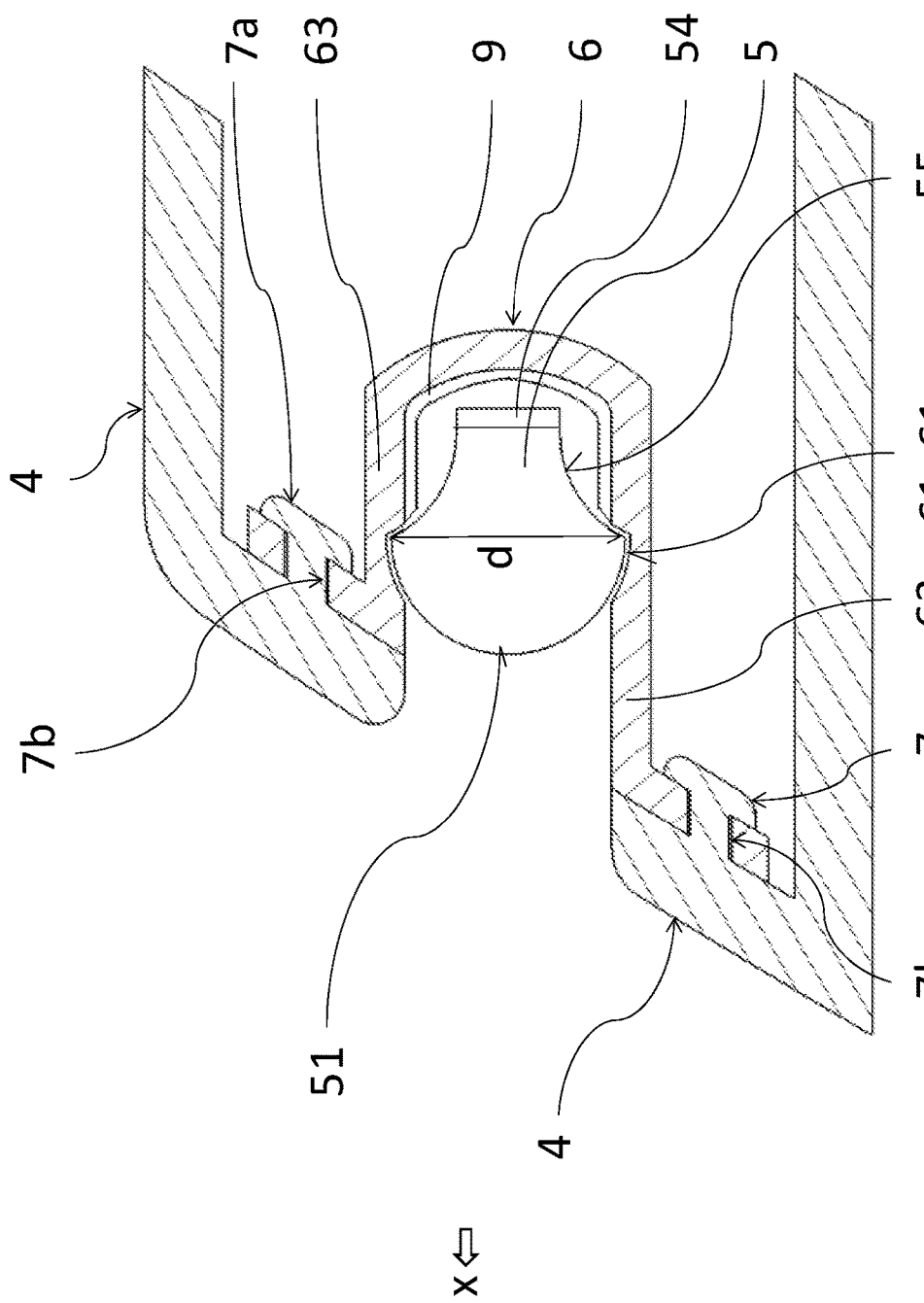
Figure 4:
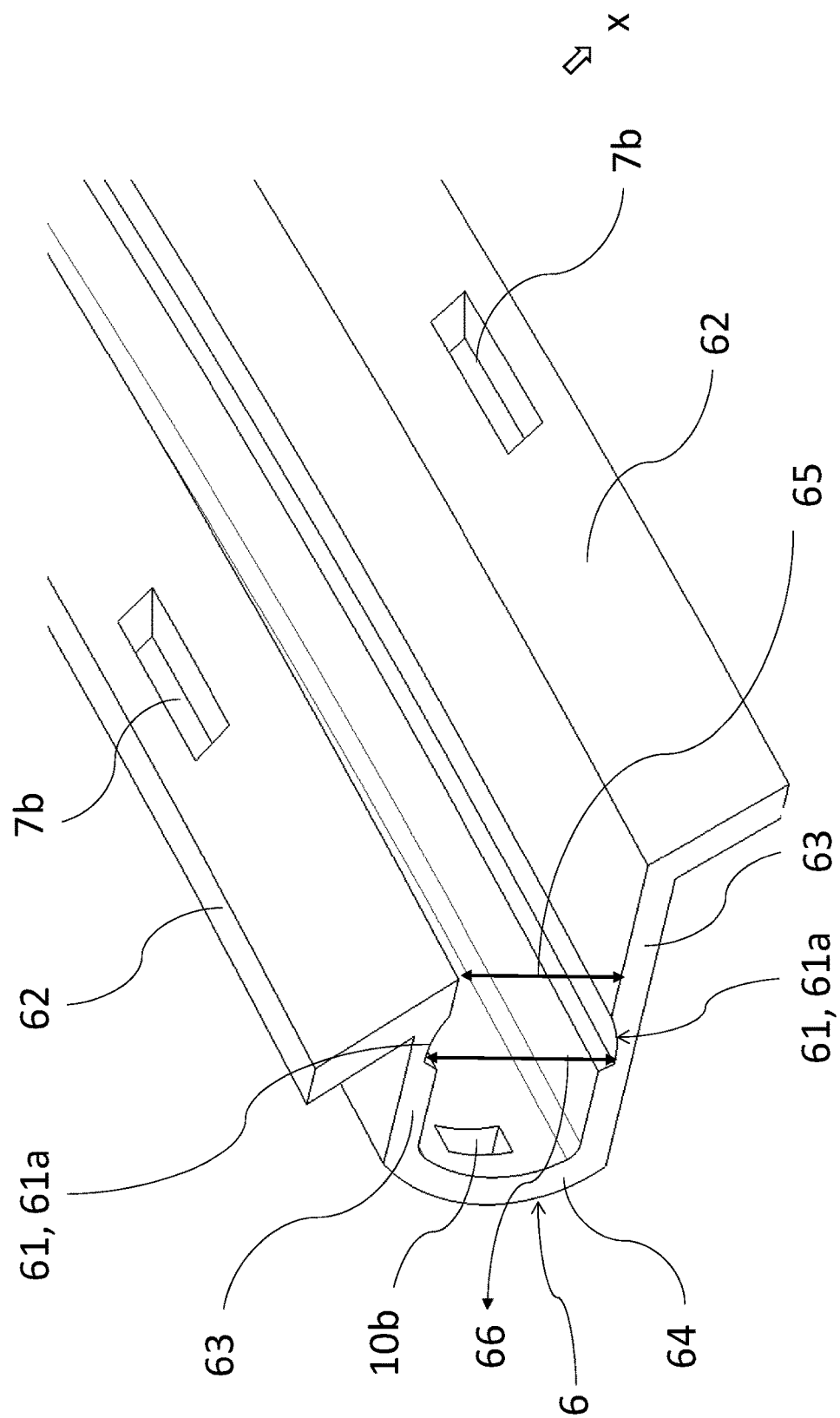
Figure 5:
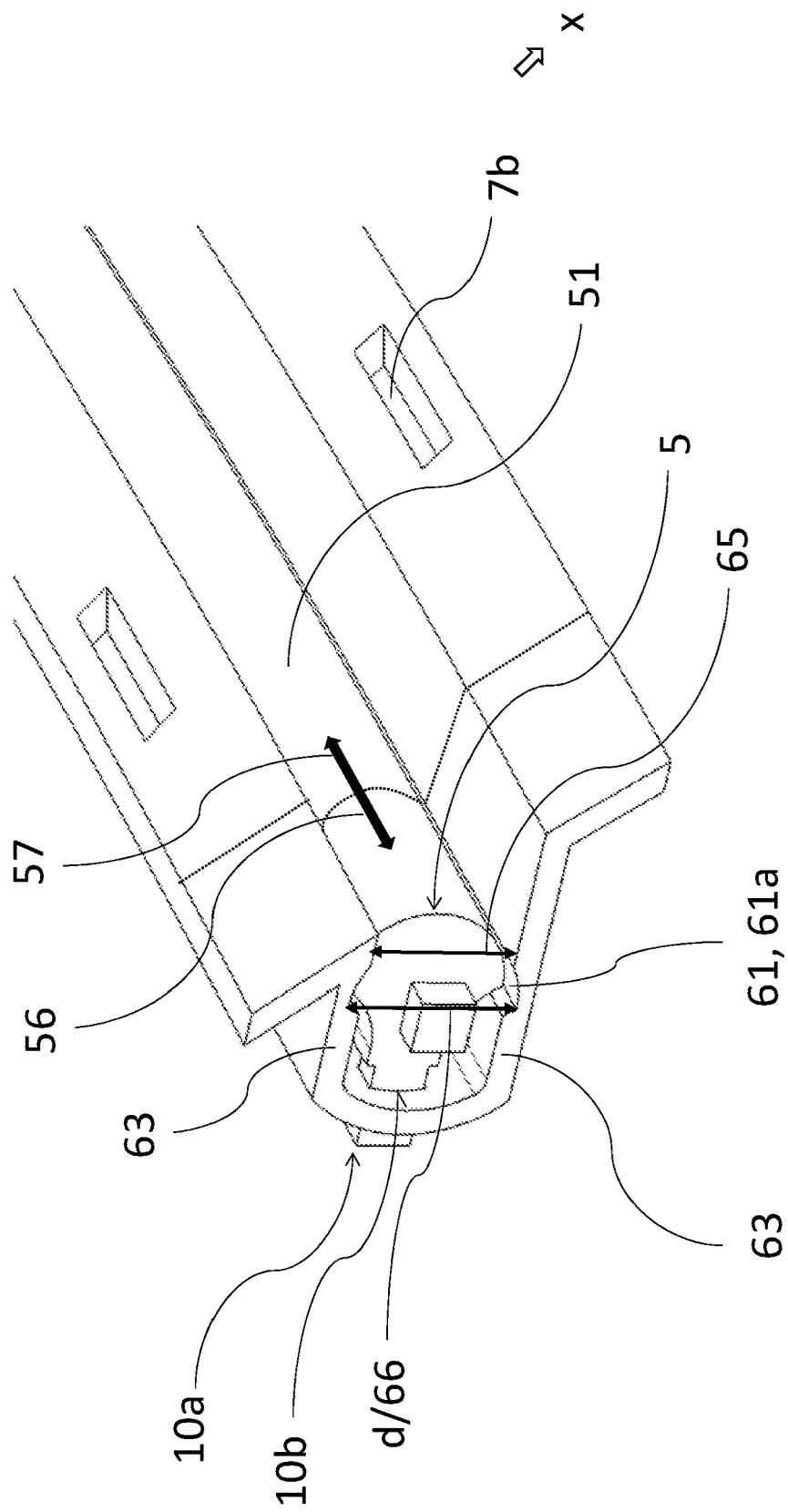
Figure 6:
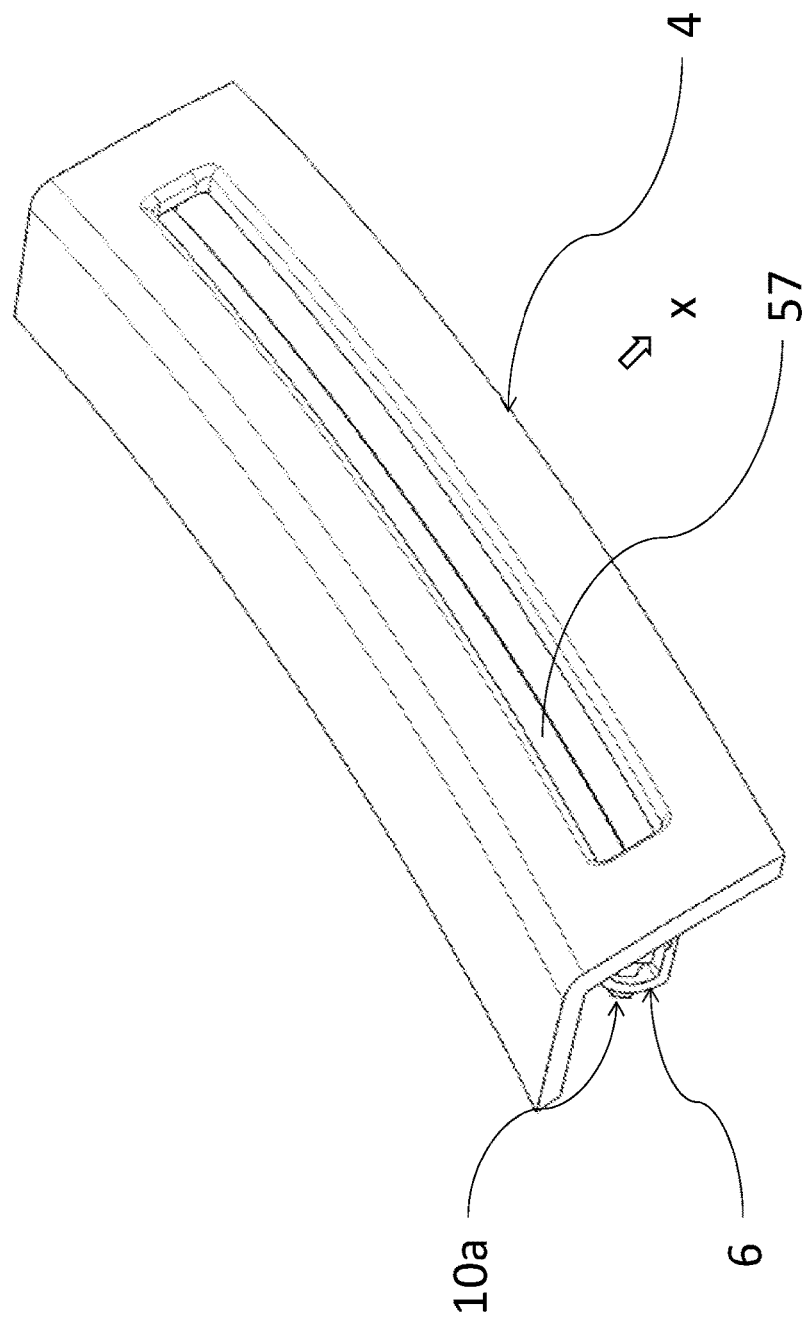
Figure 7:
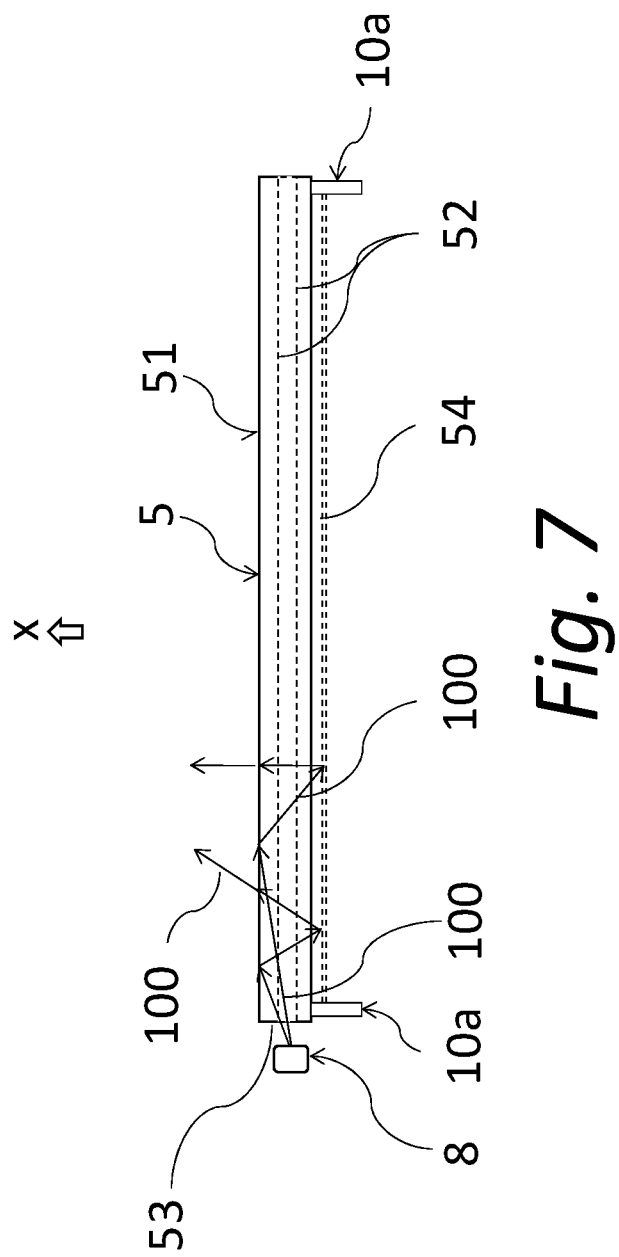
Figure 8:
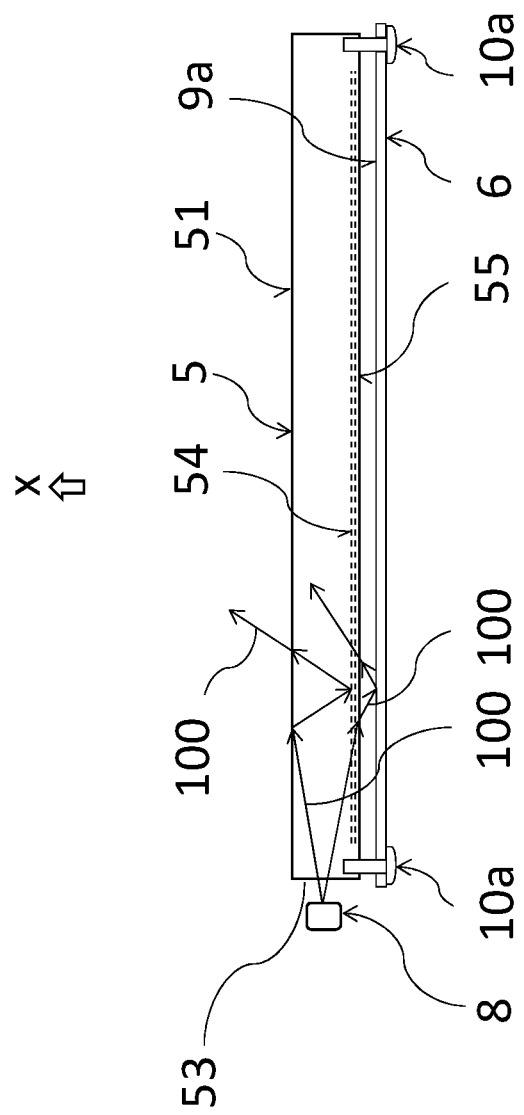
Figure 9:
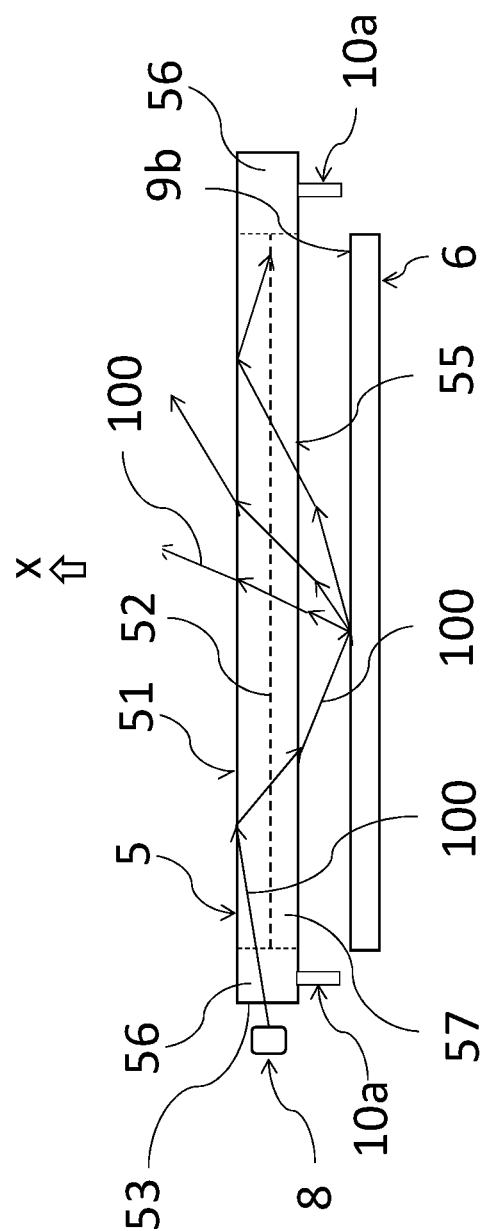
Figure 10:
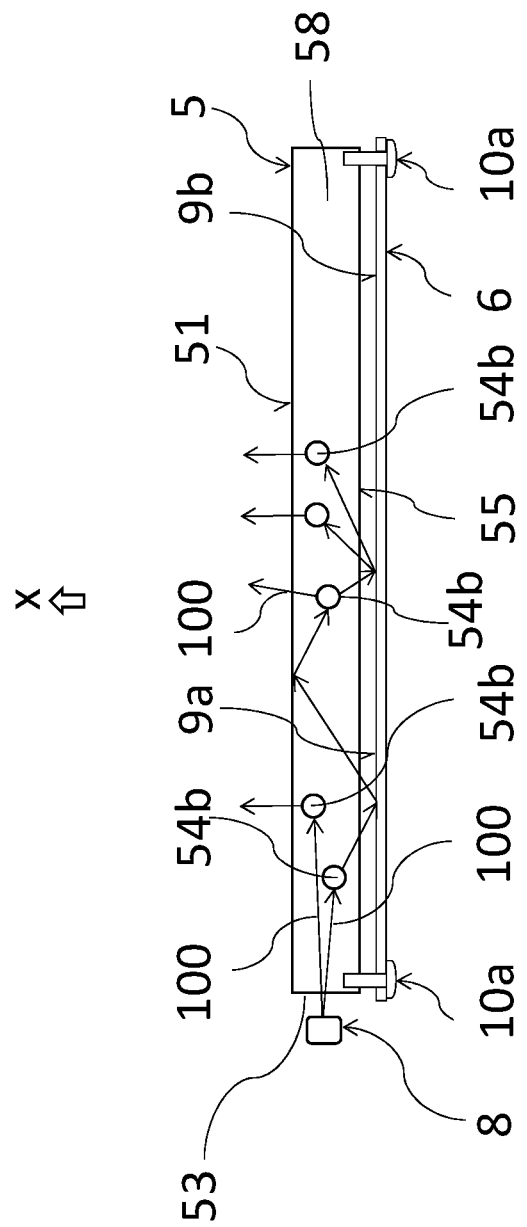
Figure 11:
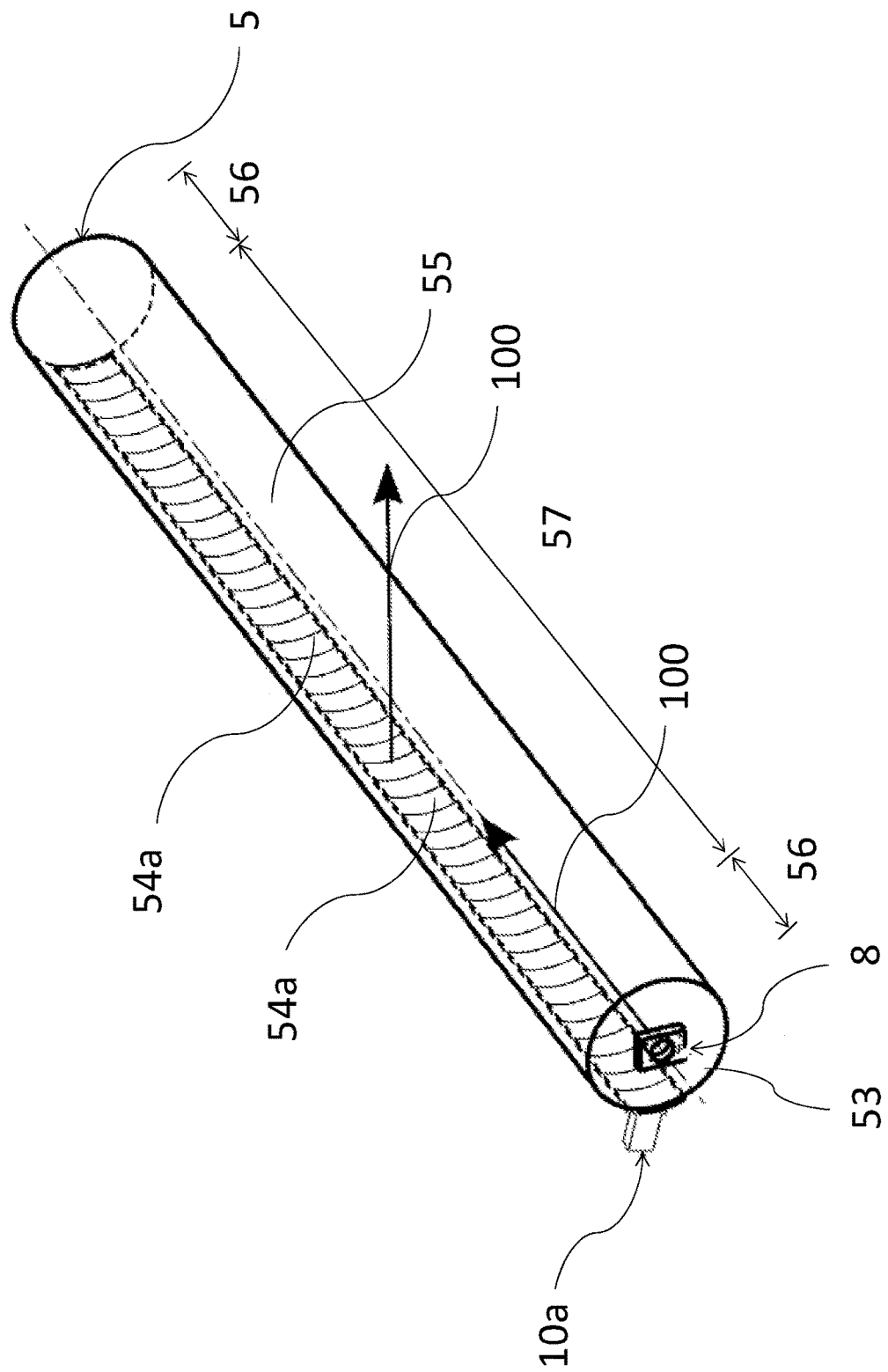
Figure 12:
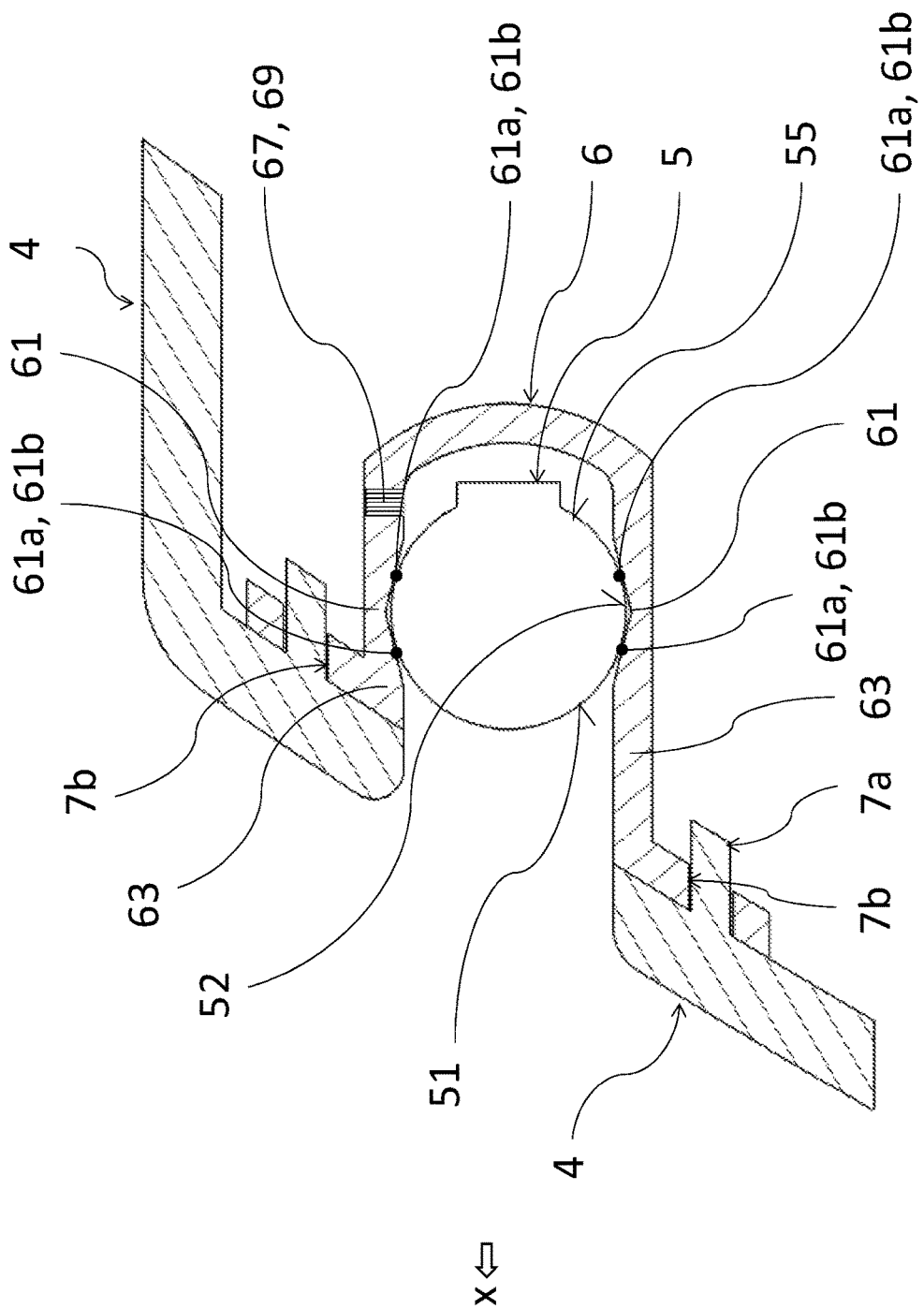
Figure 13:
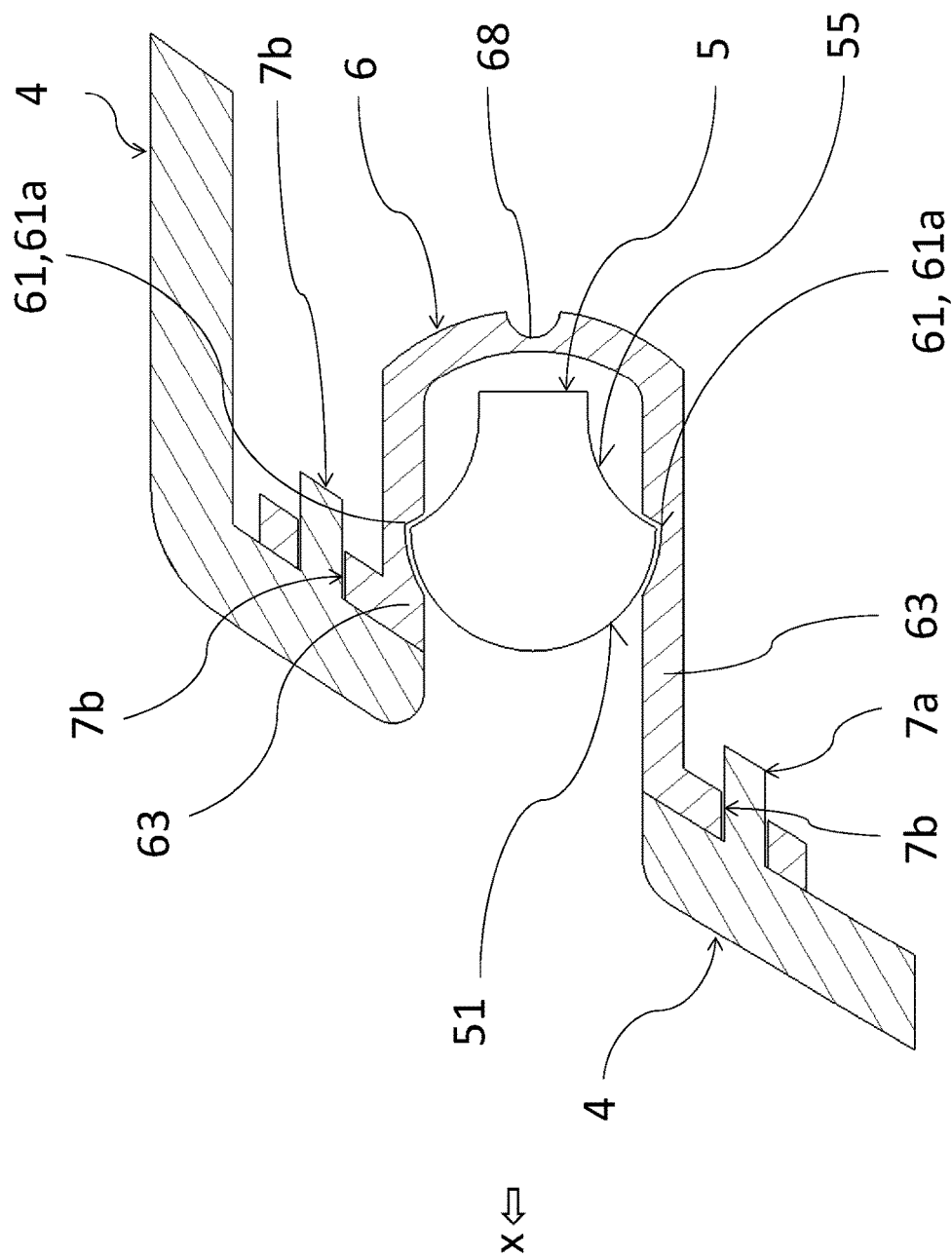
Figure 14:
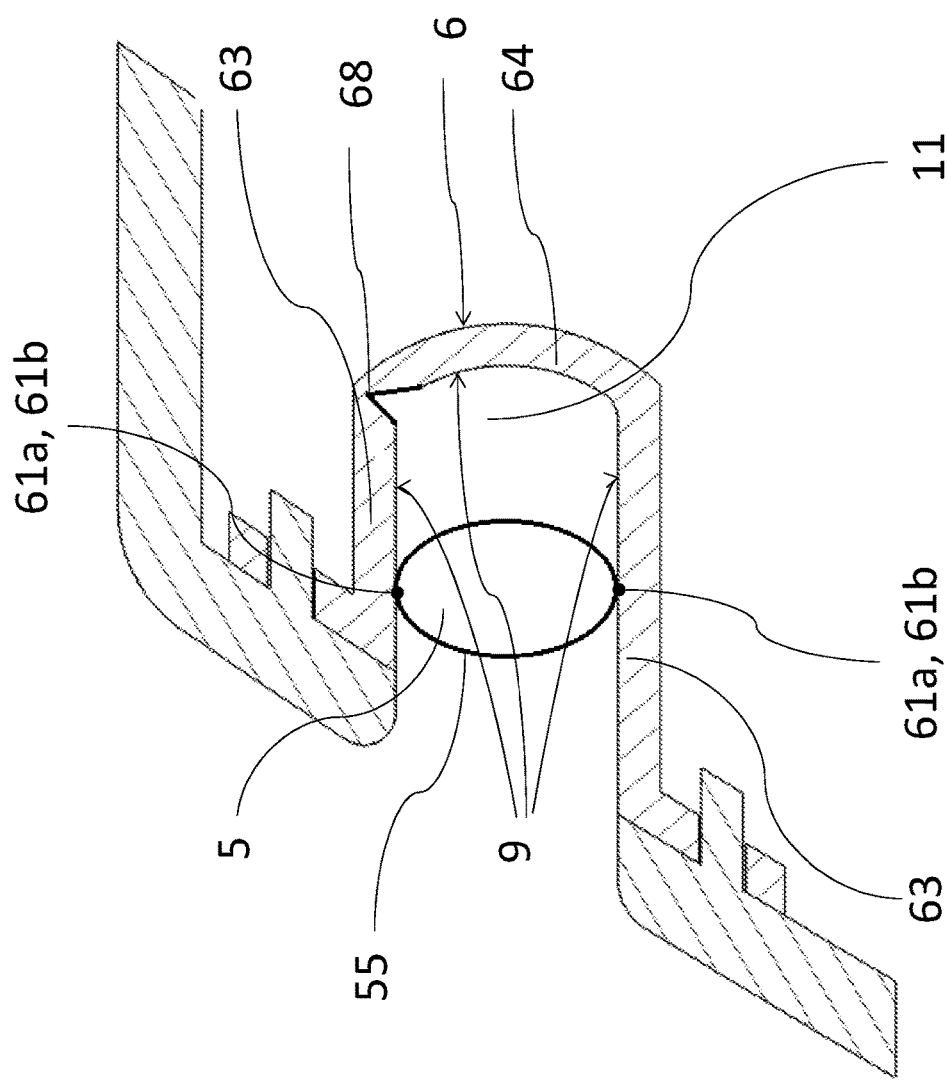

The light device for motor vehicles in accordance with the invention is clarified in more detail with the use of embodiment examples, with references to attached drawings where:

FIG. 1 shows a vertical cross-section through a first embodiment example of the light device according to the present invention, FIG. 2 shows an axonometric view of an embodiment example of the light guide, FIG. 3 shows a vertical cross-section through a second embodiment example of the light device according to the present invention, FIG. 4 shows a partial axonometric view of an embodiment example of the case used in the light device of FIG. 3, FIG. 5 shows a partial axonometric view of the position of the light guide in the case of FIG. 4, FIG. 6 shows an axonometric view of the covering mask, FIG. 7 shows a top view of the light guide, FIG. 8 shows a vertical cross-section through the light guide and case, FIG. 9 shows a vertical cross-section through the light guide and case in an alternative embodiment, FIG. 10 shows a vertical cross-section through another possible embodiment of the light guide and case, FIG. 11 shows an axonometric view of another embodiment example of the light guide, FIG. 12 shows a vertical cross-section through a third embodiment example of the light device according to the present invention, FIG. 13 shows a vertical cross-section through a fourth embodiment example of the light device according to the present invention, and FIG. 14 shows a vertical cross-section through a fifth embodiment example of the light device according to the present invention.

EXAMPLES OF EMBODIMENTS

FIG. 1 shows a first example of an embodiment of the invention wherein the light device comprises a carrier case 1 covered by a translucent cover 2, and an inner chamber 3 where a covering mask 4 is mounted, partly limiting the view of the inner chamber 3, and a light guide 5 designed to emit the output light beam. The light guide 5 is mounted in an elastic case 6 whose transversal profile has the shape of U, the elastic case 6 being equipped with two arms 63 oriented opposite each other and fitted with recesses 61. The surface of these recesses 61 represents the contact area 61a for bearing of the complementary part of the light guide 5 surface to ensure the required mounting position of the light guide 5, and thus the position of the output surface 51. The outer casing 55 of the light guide 5 in the place of the recess 61 corresponds to the shape of the recess 61 surface with its shape. The elastic case 6 and the covering mask 4 are fitted with cooperating fixing elements 7a, 7b, e.g. clips and grooves, for firm and dismountable connecting of the case 6 to the covering mask 4. The entire case 6 is made of an elastic material and makes it possible to increase the distance between the arms 63 before the introduction of the light guide 5 into its mounting position, and to reduce the distance again between the arms 63 after the introduction of the light guide 5 into its mounting position. The case 6 is connected to the covering mask 4.

FIG. 2 shows an example of a light guide for use in the light device in accordance with the invention. The linear light guide 5 has a lateral frontal surface 53 on which a light source 8 is arranged to emit light rays 100 into the light guide 5. The light guide 5, made of a plastic transparent material, is fitted with unbinding optical elements 54 in its rear part, e.g. in the form of non-transparent coating or foil attached to the outer casing 55 of the light guide 5 by pressing or injection molding, to direct light rays towards the output surface 51. The light guide 5 is divided into an active part 57 that is designed for the output of light rays 100 out of the light device and into outwardly situated inactive parts 56. The inactive parts 56 are not visible in a view of the inner chamber 3, e.g. they are concealed with a covering mask 4. In the inactive parts 56 of the light guide 5, locating elements 10a are situated that are integral parts of the light guide 5, and are designed to ensure a fixed connection of the light guide 5 to other components of the light device, e.g. the case 6.

FIG. 3 shows a second embodiment example of the invention. The elastic case 6 of the light guide 5 is firmly connected to the covering mask 4 by means of fixing elements 7a and 7b, when a non-dismountable connection is achieved though welding or riveting of the fixing elements 7a and 7b. The elastic case 6 is fitted with recesses 61 having a shape corresponding to a certain part of the mushroom-like shape of the light guide 5 with the diameter d. Between the elastic case 6 and the outer casing 55 of the light guide 5, an active optical element 9 is arranged for reflection of light rays 100, the active optical element 9 being situated, in a view of the light device, especially behind the unbinding optical elements 54.

FIG. 4 shows an elastic case 6 that consists of a transversally oriented rear face 64 from which compression arms 63 lead in the horizontal direction at both the sides. The arms 63 are fitted with recesses 61 that form contact areas 61a for bearing of parts of the light guide 5 surface having the complementary shape. From the arms 63, fixing arms 62 protrude that form the free ends of the elastic case 6, their shape and direction corresponding to the covering mask 4 in the place of their mutual contact. The arms 63 have surfaces that are situated in parallel, comprising recesses 61 in the form of longitudinally oriented grooves. The elastic case 6 is made of an elastic material so that the distance of the arms 63 forming the inner height 65 can be increased at least to the dimension of the diameter "d" of the light guide 5, the diameter "d" of the light guide 5 corresponding to the mounting height 66, i.e. the distance between the lowest and highest point of the opposite recesses 61. (See FIG. 5.) The elastic case 6 is fitted with fixing elements 7b that are provided on the fixing arms 62 to connect the elastic case 6 and the covering mask 4. The elastic case 6 is fitted with a locating element 10b on the rear face 64 to fix or stabilize the position of the light guide 5.

FIG. 5 and FIG. 6 show a method of attachment of the light guide 5 in a pre-defined and required position. The arms 63 can be extended in such a way that the light guide 5 with the diameter "d" can pass through the inner height 65 of the light guide 5 and then bear with a part of its surface on the contact areas 61a of the elastic case 6 having the corresponding shape. At the same time, the light guide 5 is inserted with its locating element 10a, situated in the inactive part 56 of the light guide 5, into the locating element 10b of the elastic case 6. The arms 63 exert slight thrust upon the light guide 5. As soon as the light guide 5 is seated in the elastic case 6, the covering mask 4 and the elastic case 6 will get connected to each other by means of the cooperating fixing elements 7a and 7b, which will make changing of the distance of the arms 63, and thus changing of the inner height 65 or the mounting height 66, impossible. The covering mask 4 makes sure that the active part 57 of the light guide 5 is only visible and most of the components of the light device are also hidden.

As seen in FIG. 7, light rays 100 from the light source 8, preferably an LED source, are bound to the light guide 5 via the input frontal surface 53. A part of the light, bound this way, further propagates through the light guide 5 until the light rays fall on the unbinding optical elements 54, which are integral parts of the light guide and are designed in such a way to reflect the light rays 100 towards the output surface 51 of the light guide 5, the light guide 5 being seated in the elastic case 6 all along its length. FIG. 7 envisages an embodiment wherein the contact area 61a of the case 6 on each of the arms 63 consists of points lying on two lines (line segments) (see e.g. line 61b in the embodiment of FIG. 12), so the light guide 5 is in contact with the case 6 on each of the arms 63 at the points of its surface lying on the lines 52.

FIG. 8 shows a light guide 5 of an elongated shape, on the frontal surface 53 of which a light source 8 is arranged, and whose casing 55 in a certain part, especially in the area of the unbinding optical elements 54, transmits light rays 100, forming an emitting surface for the output of light rays 100 that fall upon an active optical element 9, implemented in the form of a diffusion surface 9a. The active optical element 9 is part of the elastic case 6 and is adapted to reflect light rays 100. The active optical element 9 can be implemented e.g. as reflective foil or as metal plating or as a reflector. A part of the light rays 100 flowing through the light guide 5 is reflected from the unbinding optical elements 54 towards the output surface 51 of the light guide 5. A part of the light rays 100 passes through the casing 55 out of the light guide 5 and is reflected from the active optical element 9, then passes through the casing 55 again, reentering the light guide 5.

FIG. 9 shows a light guide 5 transmitting light rays 100 through the casing 55, the light rays falling upon the optical element 9 implemented in the form of reflective surface 9b. The active optical element 9 is part of the elastic case 6 and is adapted for diffusion of light rays 100, the light rays 100 being radiated to different directions, being subsequently re-bound to the light guide 5. The elastic case 6 is only situated in the active part 57 of the light guide 5. FIG. 9 envisages an embodiment wherein the contact area 61a of the case 6 is formed on each of the arms 63 of points lying on a line (line segment) (see e.g., line 61b in the embodiment of FIG. 14), so the light guide 5 is in contact with the case 6 on each of the arms 63 with the points of its surface lying on the line 52.

FIG. 10 schematically shows a light guide 5, the body 58 of which contains unbinding optical elements 54 in the form of diffusion particles 54b for diffusion and guiding of light rays 100 through the outer casing 55 out of the light guide 5. The light rays 100 exit not only through the output surfaces 51, but also through the other parts of the outer casing 55 while they fall upon the active optical element 9 situated in a part of the surface of the casing 6. The active optical element 9 is implemented in the form of a diffusion surface 9a and/or reflective surface 9b for reflection and/or diffusion of light rays 100 and their binding back to the light guide 5. The light guide 5 is made as one piece with the use of the process of plastic injection molding, the active diffusion particles 54b being an additive already contained in the plastic before the injection process.

FIG. 11 is a schematic representation of a light guide 5 whose unbinding optical elements 54 are designed as an array of reflective surfaces 54a used to reflect light rays towards outer casing 55 or to the body 58 of the light guide 5.

FIG. 12 shows a third embodiment example of the light guide wherein the case 6 is fitted with a separate elastic element, which is, in the example shown, molded addition 67 of an elastic material, but a joint or a spring could be used instead. The elastic element 69 enables deflection of at least one arm 63, the arms 63 being fitted with recesses 61 on their inner surface, making it possible to fix the position of the light guide 5 in its mounting position wherein the light guide 5 is in contact with the arms 63 along four lines 61b altogether. As indicated by this embodiment of the invention, the case 6 does not need to be, except the molded addition 67, made of an elastic material.

FIG. 13 shows a fourth embodiment example of the light device wherein the case 6 contains a recess 68, making it possible to extend the arms 63 during the insertion of the light guide 5 into its mounting position, or during withdrawal of the light guide 5 from the mounting position. The recess can also be designed as a film hinge. As indicated by this embodiment of the invention, the case 6 does not necessarily need to be, except the area of the recess 68, made of an elastic material.

FIG. 14 shows a fifth embodiment example of the light device according to the invention wherein the case 6 is, on the transition of the rear face 64 and arm 63, fitted with a recess 68 having the shape of a notch, making it possible to extend the arms 63 during the insertion of the light guide 5 into its mounting position, or during withdrawal of the light guide 5 from its mounting position. The recess 68 can be designed as a film hinge again. Between the light guide 5 and the case 6, an active optical element 9 is, forming a chamber 11 together with the light guide 5 in the transversal direction, adapted to reflect/diffuse light rays 100. On either arm 63, the contact area 61a consists of points lying on the line 61b, and at these points the surface of the light guide 5 touches the arms 63. The light guide 5 has an elliptic shape, the surface of the outer casing 55 being, in all the active area 57, smooth without protrusions, clicks, recesses and other means that have a negative impact on the guiding of light in the light guide 5 body 58.

LIST OF REFERENCE MARKS

1—carrier case
2—translucent cover
3—inner chamber
4—covering mask
5—light guide
51—output surface
52—line
53—frontal surface
54—unbinding optical element
54a—reflective surface
54b—diffusion particle
55—outer casing
56—inactive part
57—active part
58—body
6—case
61—recess
61a—contact area
61b—line
62—fixing arm
63—arm
64—rear face
65—inner height
66—mounting height
67—molded addition of elastic material
68—recess
69—elastic element
7a, 7b—fixing element
8—light source
9—active optical element
9a—diffusion surface
9b—reflective surface
10a, 10b—locating element
11—chamber
100—light ray
d—diameter of light guide
x—direction indicator

The invention claimed is:

1. A light device for motor vehicles comprising a carrier case (1), covered by a translucent cover (2), and an inner chamber (3) where a light source (8) for emitting light rays (100) and a light guide (5) of a linear shape for guiding of light rays (100) are mounted, wherein a part of an outer casing (55) of the light guide (5) forms an output surface (51) for the exit of light rays (100), the light guide (5) comprising unbinding optical elements (54) adapted to direct the light rays (100) towards the output surface (51) and a body (58) comprising an active part (57) adapted for the output of light rays (100) from the light guide (5) and further out of the light device, and an inactive part (56) that is not visible in the view of the inner chamber (3) through the translucent cover (2), wherein the light device contains a case (6) comprising two arms (63), each of which forming at least one at least partially concave contact area (61a) on an inner surface thereof to connect the light guide (5) in a mounting position between the contact areas (61a) of the arms (63), the case (6) being adapted to enable increasing of a distance between the contact areas (61a) during introduction of the light guide (5) into the mounting position, and subsequent reducing of this distance after the introduction of the light guide (5) into the mounting position to a distance at which the arms (63) are in contact with a surface of the light guide (5) in the contact areas (61a) while, when the light guide (5) is fixed in the mounting position, the case (6) is fixed to another part of the light device to fix the mutual position of the arms (63).

2. The light device in accordance with claim 1, wherein the light device comprises a covering mask (4) provided with fixing elements (7a) for engagement with fixing elements (7b) formed on the case (6), so that mutual connection of the fixing elements (7a) and (7b) can fix the mutual position of the arms (63) of the case (6) to maintain a permanent distance of the contact areas (61a).

3. The light device in accordance with claim 1, wherein at least a part of the case (6) is made of an elastic material to ensure the possibility to increase the distance between the contact areas (61a).

4. The light device in accordance with claim 3, wherein the case (6) is an integral molding made of an elastic material.

5. The light device in accordance with claim 1, wherein the case (6) is provided with an elastic element (69), preferably a spring or molded addition (67) of an elastic material, to ensure the possibility of increasing the distance between the contact areas (61a).

6. The light device in accordance with claim 1, wherein the case (6) is provided with a joint, recess (68) or film hinge to ensure the possibility of increasing the distance between the contact areas (61a).

7. The light device in accordance with claim 1, wherein the contact area (61a) includes a recess (61) configured in such a way that a complementary part of the surface of the light guide (5), when positioned in the mounting position, can bear against a surface of the recess (61).

8. The light device in accordance with claim 1, wherein at least one of the arms (63) comprises a recess (61) configured in such a way that contact area (61a) comprises points lying on lines (61b) that lead approximately in parallel to a longitudinal axis of the light guide (5).

9. The light device in accordance with claim 1, wherein the inner surface of the arms (63) is planar and the contact area (61a) consists of lines (61b), wherein the light guide (5) is fixed in its mounting position by the action of the pressure of the arms (63) on the surface of the light guide (5).

10. The light device in accordance with claim 1, wherein the light guide (5) is provided with a locating element (10a) for connecting to a locating element (10b) on the case (6), with the respective locating elements adapted to prevent rotary and sliding movement in the direction of a longitudinal axis of the light guide (5) when mounted in the case (6).

11. The light device in accordance with claim 10, wherein the locating element (10b) on the case (6) adapted for connecting to the respective locating element (10a) on the light guide (5) is arranged on the arm (63) of the case (6) and/or a rear face (64) of the case (6), mutually connecting the arms (63).

12. The light device in accordance with claim 10, wherein the locating element (10a) of the light guide (5) is situated in the inactive part (56) of the light guide (5).

13. The light device in accordance with claim 10, wherein the locating element (10b) on the case (6) is an opening, and the opposite locating element (10a) on light guide (5) is a projection to be inserted into the opening.

14. The light device in accordance with claim 1, wherein between the light guide (5) in the mounting position and the case (6) towards a rear face (64)thereof mutually connecting the arms (63), a chamber (11) is defined that contains an active optical element (9), preferably a diffusion optical element and/or a reflective optical element to return the rays (100) that have escaped from the light guide (5) through a part of its surface, which is different from the output surface (51), back to the light guide (5).

15. The light device in accordance with claim 14, wherein the active optical element (9) is in the form of a diffusion surface (9a) and/or reflective surface (9a), which a part or parts of an inner surface that delimits the chamber (11) is/are provided with.

16. The light device in accordance with claim 1, wherein the light guide (5) has a continuous surface in all its active part (57) without the presence of any shaped elements, preferably projections or recesses, to avoid negative impacts of shaped elements on guiding of light rays (100) in the body (58) of the light guide (5).

\* \* \* \* \*